INVENTOR.
Edward H. Kluckhohn
BY Smith, Olsen + Baird
Attys.

Nov. 13, 1956 E. H. KLUCKHOHN 2,770,076
METHODS OF REMOVING AND TRANSPLANTING TREES
Original Filed Dec. 11, 1947 2 Sheets-Sheet 2
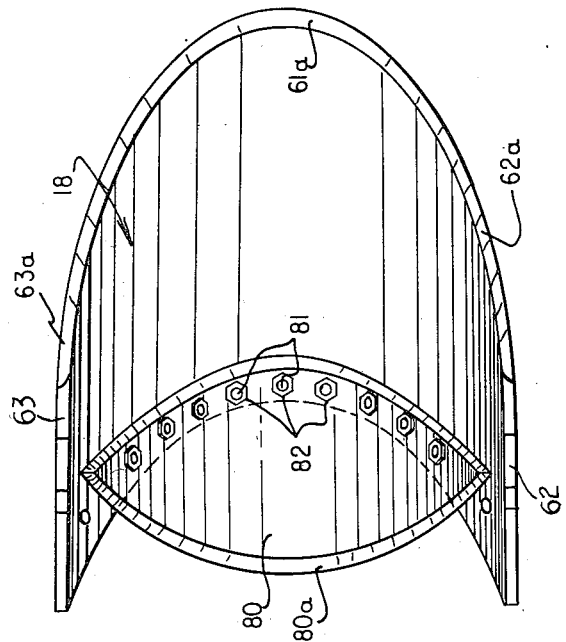
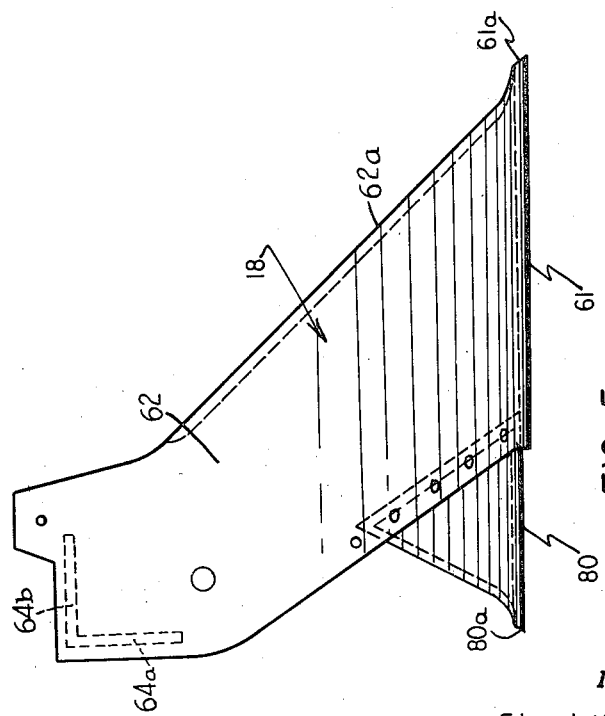
INVENTOR.
Edward H. Kluckhohn
BY Smith, Olsen + Baird
Attys.

2,770,076
Patented Nov. 13, 1956

2,770,076

METHODS OF REMOVING AND TRANSPLANTING TREES

Edward H. Kluckhohn, Naperville, Ill.

Original application December 11, 1947, Serial No. 791,028, now Patent No. 2,652,639, dated September 22, 1953. Divided and this application January 8, 1953, Serial No. 330,285

4 Claims. (Cl. 47—58)

The present invention relates to methods of removing and transplanting mature trees without injury thereto. This application is a division of the copending application of Edward H. Kluckhohn, Serial No. 791,028, filed December 11, 1947, now Patent No. 2,652,639, granted September 22, 1953.

Heretofore, in transplanting a tree, the tree has been removed from the earth by first digging a trench in the earth in surrounding relation with the foot of the tree; undercutting the roots of the tree from the trench; and then lifting the tree by its trunk from the resulting hole in the earth together with any earth adhering to the roots thereof. The roots of the tree are then wrapped in burlap cloth or the like in order to prevent further damage thereto and to retain in place as much of the adhering earth as possible. Next, the tree is transported to the site of a previously prepared hole in the earth; the burlap cloth is removed from the roots; the roots are lowered into the hole employing the trunk of the tree; the trunk is then straightened into a substantially vertical position; and ultimately the hole is filled with earth about the roots of the tree.

Not only is this method laborious and expensive, but a considerable number of trees thus transplanted ultimately die. This results not only from the obvious damage to the roots of the tree, but also from the damage to the trunk of the tree, which damages are inherent in the method. Moreover, it is believed that the loss of the original clump of earth enveloping the mass of roots of the tree, which loss is also inherent in the method, is another important factor in the mortality rate experienced incident to transplanting.

Accordingly, it is a general object of the present invention to provide an improved method of removing a tree from the earth incident to transplanting thereof, whereby there is virtually no damage to the trunk and to the mass of roots thereof, and wherein the original clump of earth enveloping the mass of roots of the tree is not disturbed.

Another object of the invention is to provide an improved method of transplanting trees, wherein the mortality rate incident thereto is substantially reduced.

Still another object of the invention is to provide an improved method of transplanting trees which may be employed to perform that operation more quickly and economically than has been possible by the use of any method heretofore known, even when the trees are of large size.

Further features of the invention pertain to the particular sequence of the steps of the method, whereby the above-outlined and additional operating features thereof are attained.

The invention, both as to its organization and method of operation, together with further objects and advantages thereof, will best be understood by reference to the following specification taken in connection with the accompanying drawings, in which:

Fig. 5 is an enlarged side elevational view of the lower portion of the bucket shown in Fig. 1, and a detachable apron carried thereby; and Fig. 6 is a plan view of the lower portion of the bucket and the apron carried thereby, as shown in Fig. 3.

Figure 1:
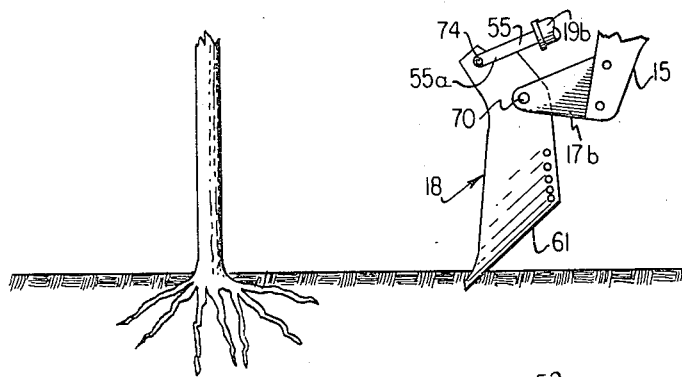
Figure 1 shows a side elevation of an earth digging bucket and a portion of the operating mechanism therefor which is disclosed in said Letters Patent No. 2,652,639, illustrating the bucket in its initial position with respect to a tree in the first step of removing and transplanting a tree.
Figure 2:
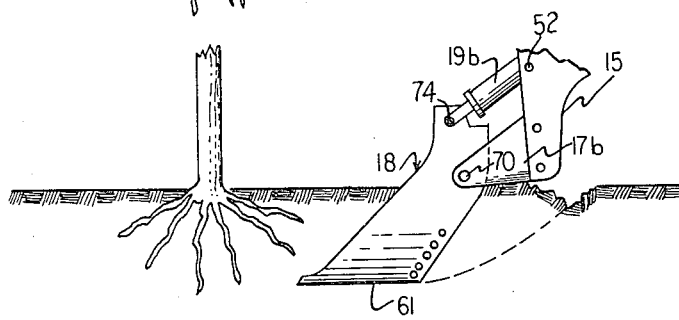
Fig. 2 is a view similar to that of Fig. 1, showing the bucket or cutter after it has been forced into the earth and advanced toward the tree with its lower part somewhat below the level of the lowermost roots of the tree.

The method of the invention may preferably be carried out with an earth working machine of the type disclosed in my said Letters Patent No. 2,652,639 to which reference is made as a part of the disclosure of the present application. Such a machine comprises an engine, track laying mechanism of the caterpillar type, a supporting frame and a pivoted supporting boom 15, a part of which is shown in Figs. 1 to 4 inclusive. The machine also comprises hydraulic rams arranged at the sides of the machine between the frame and the boom 15 for the purpose of raising the boom 15 with respect to the frame. The front end of the boom 15 carries two supporting plates 17b disposed at the right and left hand sides thereof and having pivotally mounted thereon, on the pivots 70, an earth digging bucket 18. The machine also comprises two hydraulic actuators 19b disposed at the right and left hand sides of the machine and pivotally connected to the bucket at 74 and to the boom at 52, for the purpose of controlling the position of the bucket 18 with respect to the boom. The machine also comprises controlling apparatus and a hydraulic control system for operating the rams 16b and the actuators 19b and for controlling the travel of the machine along the surface of the earth.

When the actuators 19b are expanded, the bucket 18 is rotated in the counter-clockwise direction about its pivots on the supporting plates 17b, as viewed in Fig. 1, and, when the actuators 19b are contracted, the bucket 18 is rotated in the clockwise direction about those pivots. The boom 15 is raised by the hydraulic rams and is lowered by gravity, but the bucket 18 is rotated in either direction about the pivots 70 on the plates 17b by the direct action of the actuators 19b.

The bucket 18 comprises a substantially semi-cylindrical bottom wall 61 and two substantially flat parallel spaced-apart side walls 62 and 63 formed integrally therewith to define open front and rear faces. The side walls 62 and 63 extend upwardly and rearwardly from the bottom wall 61, the leading and trailing edges of the side walls 62 and 63 converging upwardly; whereby the depth of the bottom wall 61 is greater than that of the side walls 62 and 63. Also the leading edges of the bottom wall 61 and the side walls 62 and 63 are provided with earth-cutting knives respectively indicated at 61a, 62a and 63a. In order to lend rigidity to the structure of the bucket 18, a substantially vertically disposed plate 64a and a substantially horizontally disposed plate 64b are arranged between the side walls 62 and 63 respectively adjacent to the rear and top edges thereof. This substantially L-shaped structure formed by the plates 64a and 64b is secured in place between the side walls 62 and 63 by welding or the like.

As shown in Figs. 5 and 6, the bucket 18 may be provided with a detachable apron 80 that may be removably secured to the bottom wall 61 adjacent to the trailing edge thereof by a series of bolts 81 and cooperating nuts 82. The apron 80 is substantially semi-cylindrical and may be readily detachably secured in place within the bottom wall 61 in the manner noted. Preferably, the nuts 82 are arranged adjacent to the leading edge of the apron 80 that, in turn, is disposed over the trailing edge of the bottom wall 61 in order that the heads of the bolts 81 do not materially interfere with earth digging when the apron 80 is utilized with the bucket 18. The trailing edge of the apron 80 is provided with an earth-cutting knife, indicated at 80a, so that earth digging may be effected in either direction by the bucket 18 when the apron 80 is attached thereto. Preferably, a plurality of the aprons 80 of different shapes and sizes are provided so that the one best suited to the earth digging operation contemplated may be selected and detachably secured to the bucket 18.

Figure 3:
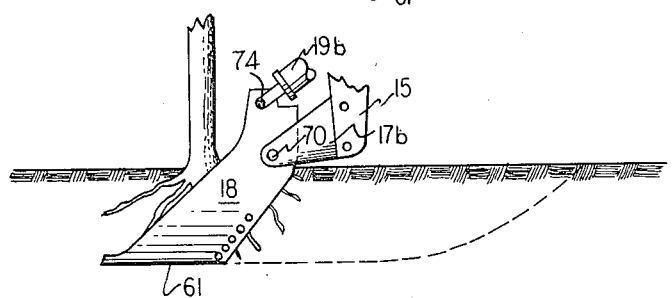
Fig. 3 is a view similar to those of Figs. 1 and 2, showing a still later stage of the operation where the bucket has cut beneath the tree roots and the body of earth surrounding the roots.
Figure 4:
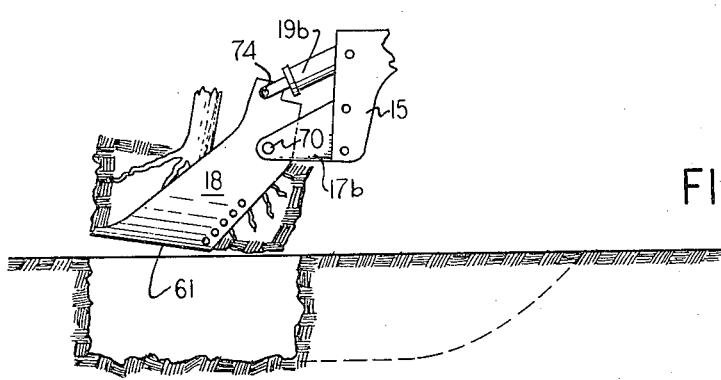
Fig. 4 is a view similar to those of Figs. 1, 2 and 3, showing the positions of the bucket and the tree after the bucket has been elevated to remove the tree roots and the surrounding ball of earth from the main body of earth.

Considering now the transplanting of a tree in accordance with the method of the present invention and referring to Figs. 1 to 4, inclusive, it is pointed out that the machine is utilized in conjunction with the bucket 18 and that the apron 80 may be attached to the bucket 18 if desired, although this is not necessary. In carrying out the method, a hole is first prepared in the earth, utilizing the machine and the bucket 18, in which the tree is to be placed. The machine is then employed in removing the tree from its present location. More particularly, the machine is moved to the present location of the tree and aligned with respect to the center line of the trunk of the tree in the immediate vicinity thereof. Next the actuators 19b are expanded in order to tilt the bucket 18 so that the bottom wall 61 thereof is inclined with respect to the earth. At this time the boom 15 is lowered in order to force the leading edge of the bucket 18 into the earth in an inclined position in the vicinity of the tree. After the leading edge of the bottom wall 61 of the bucket 18 has been forced into the earth to a depth somewhat greater than that of the mass of roots of the tree and the side walls 62 and 63 of the bucket 18 are aligned with respect to the opposite sides of the trunk of the tree, the actuators 19b are contracted in order to tilt the bucket 18 so that the bottom wall 61 thereof is moved into a substantially horizontal position and disposed at a depth greater than that of the mass of roots of the tree. These steps will be readily understood from an examination of Figs. 1 and 2. Next the boom 15 is advanced toward the tree so that the earth entering the open front face of the bucket 18 passes over the bottom wall 61 and out of the open rear face of the bucket 18; which advancement of the boom 15 is continued until the leading edge of the bottom wall 61 has moved past the mass of roots of the tree and the center of gravity of the tree is disposed above the bottom wall 61; all as clearly indicated in Fig. 3. At this time, the boom 15 is raised in order to remove the tree, together with the undisturbed clump of earth enveloping the mass of roots of the tree, as indicated in Fig. 4. Subsequently, as the boom 15 is further raised the actuators 19b are expanded slightly in order to tilt the bucket 18 as it is raised so as to maintain the trunk of the tree in a substantially vertical position. Next the machine 11, the bucket 18 and its contents, are moved from the vicinity of the old location of the tree to the previously prepared hole in the earth where the tree is to be relocated. At this time the machine 11 is operated to center the bucket 18 and its contents with respect to the previously prepared hole; whereupon the boom 15 is lowered and the actuators 19b are contracted slightly in order to pivot the bucket 18 to maintain the trunk of the tree in a substantially vertical position. The mass of roots of the tree are thus lowered into the prepared hole until the bottom wall 61 of the bucket 18 rests upon the earth at the bottom of the prepared hole. At this time, the machine 11 is moved away from the prepared hole, the boom 15 is raised and the actuators 19b are expanded to tilt the bucket 18; whereby the bucket 18 is removed from the prepared hole leaving the mass of the roots of the tree therein. At this time the trunk of the tree is straightened with respect to the vertical position and loose earth is filled into the hole about the clump of earth enveloping the mass of roots of the tree.

This improved method of transplanting a tree is very advantageous in view of the fact that neither the trunk nor the mass of roots of the tree are in any way damaged incident to the removal of the tree from its old location. Moreover, the original clump of earth enveloping the mass of roots of the tree is preserved and transported along with the tree by the machine 11 into the new location; whereby the original clump of earth enveloping the mass of roots of the tree is undisturbed incident to transplanting the tree from its old location to its new location; which factor is considered to be very important in reducing the mortality rate of trees incident to the transplanting thereof utilizing the present method. Moreover, the present method minimizes handling of the tree, as it will be understood that the tree is ordinarily transported from its old location to its new location utilizing the bucket 18, without transferring the tree to another vehicle.

It is advantageous to utilize the apron 80 in conjunction with the bucket 18 when the tree being transplanted is fairly large since the apron 18 not only extends the bottom wall 61 of the bucket 18, preventing disturbance of the original clump of earth enveloping the mass of roots of the tree, but it also provides the bucket 18 with earth-cutting facility in either direction which may occasionally be required. In other words, after the leading edge of the bucket has been moved past the mass of roots of the tree, as illustrated in Fig. 3, it may be desirable to move the bucket 18 back and forth toward and away from the tree, when the apron 80 is attached, permitting earth-cutting in either direction and the consequent severing of the ends of the roots of the tree projecting beyond the principal mass thereof. The semi-cylindrical shape of the bottom wall 61 of the bucket 18, as well as that of the apron 80, is very advantageous in the removal of trees since the principal mass of roots of a tree have a generally semi-spherical configuration.

In view of the foregoing, it is apparent that there has been provided an improved method of transplanting mature trees without injury thereto and with a great saving of time and expense. The present method makes it possible to transplant trees many times faster than has been possible with any method heretofore used. Mature trees, even those of large size, may be quickly moved long distances to new locations in a relatively short time and at a relatively small cost. The present invention makes it possible to transplant large numbers of trees in less time and at less expense than has been required in the method heretofore employed in transplanting a single tree.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. The method of removing a mature tree from the body of the earth utilizing an upstanding substantially U-shaped cutter having open front and rear faces; said method comprising submerging the upstanding cutter in the body of the earth at a first location disposed on one side of the tree and removed therefrom, advancing the submerged upstanding cutter in a substantially horizontal direction toward the tree and into a second location disposed directly below the tree in order to sever with the submerged upstanding cutter an elongated substantially horizontally disposed strip of earth substantially U-shaped in cross-section free from the body of the earth toward and only slightly past the mass of roots of the tree while leaving the cut strip of earth in place in the body of the earth and to sever with the submerged upstanding cutter the roots of the tree projecting beyond the confines of the submerged upstanding cutter, and then lifting the upstanding cutter from the body of the earth so as to raise therewith only the clump of the cut strip of earth disposed directly below the tree and enveloping the mass of the roots of the tree together with the tree and so as to leave undisturbed the raised clump of earth enveloping the mass of roots of the raised tree.

2. The method of transplanting a mature tree from a first site to a second site utilizing an upstanding substantially U-shaped cutter having open front and rear faces; said method comprising submerging the upstanding cutter in the body of the earth at a first location at the first site disposed on one side of the tree and removed therefrom, advancing the submerged upstanding cutter in a substantially horizontal direction toward the tree and into a second location at the first site disposed directly below the tree in order to sever with the submerged upstanding cutter an elongated substantially horizontally disposed strip of earth substantially U-shaped in cross-section free from the body of the earth at the first site toward and slightly past the mass of roots of the tree while leaving the cut strip of earth in place in the body of the earth at the first site and to sever with the submerged upstanding cutter the roots of the tree projecting beyond the confines of the submerged upstanding cutter, lifting the upstanding cutter from the body of the earth at the first site so as to raise therewith only the clump of the cut strip of earth at the first site disposed directly below the tree and enveloping the mass of roots of the tree together with the tree and so as to leave undisturbed the raised clump of earth enveloping the mass of the roots of the raised tree, transporting the upstanding cutter and its contents from the first site to a previously-prepared hole in the body of the earth at the second site, lowering the upstanding cutter and its contents into the prepared hole, and removing the upstanding cutter from the prepared hole while leaving the clump of earth enveloping the mass of roots of the tree in the prepared hole with the trunk of the tree projecting upwardly from the prepared hole.

3. The method of removing a mature growing tree from the body of the earth with the use of an upstanding substantially U-shaped cutter which comprises the steps of forcing the upstanding cutter into the earth at a point removed from the tree, advancing the cutter horizontally with its lower part at a depth substantially below the mass of roots of the tree until it lies below and slightly past the said mass of roots, and then lifting the upstanding cutter from the body of the earth so as to raise therewith the tree and only the cut body of the earth which envelops the roots beneath the tree while supporting said clump of earth by the cutter and leaving undisturbed the said clump of earth enveloping the tree roots.

4. The method of transplanting a mature tree from a first site to a second site with the use of an upstanding substantially U-shaped cutter, comprising the steps of forming a hole in the earth at the said second site, forcing the upstanding cutter into the body of the earth at a point to one side of the tree at the said first site, advancing the submerged cutter in a substantially horizontal direction until it lies directly below the trunk of the tree, thereby severing an elongated strip of earth adjacent to and slightly past the mass of roots of the tree while leaving the cut strip of earth in place and severing the roots of the tree which project beyond the confines of the submerged upstanding cutter, then lifting the cutter from the body of the earth and raising the tree and its roots together with the clump of earth surrounding the roots below the tree, while leaving undisturbed the earth enveloping said roots, transporting the upstanding cutter and its contents including said clump of earth, from the said first site to the said previously prepared hole in the body of the earth at the said second site, lowering the upstanding cutter and its contents into said hole and then removing the upstanding cutter from said hole while leaving the said clump of earth in said hole with the trunk of the tree projecting upwardly therefrom.

References Cited in the file of this patent

UNITED STATES PATENTS

| | | |
|---|---|---|
| 1,909,752 | Calkins | May 16, 1933 |
| 2,410,203 | Culley | Oct. 29, 1946 |
| 2,506,662 | Cusenbary | May 9, 1950 |
| 2,549,476 | Johnson | Apr. 17, 1951 |
| 2,618,871 | Craver | Nov. 25, 1952 |